US008851692B2

(12) United States Patent
Baier

(10) Patent No.: US 8,851,692 B2
(45) Date of Patent: Oct. 7, 2014

(54) HOLDING DEVICE FOR AN OPERATING DEVICE

(75) Inventor: Martin Baier, Ettlingen (DE)

(73) Assignee: E.G.O. Elektro-Gerätebau GmbH, Oberderdingen (DE)

(*) Notice: Subject to any disclaimer, the term of this patent is extended or adjusted under 35 U.S.C. 154(b) by 437 days.

(21) Appl. No.: 13/179,655

(22) Filed: Jul. 11, 2011

(65) Prior Publication Data

US 2012/0012721 A1 Jan. 19, 2012

(30) Foreign Application Priority Data

Jul. 15, 2010 (DE) ........................ 10 2010 031 405

(51) Int. Cl.

| | |
|---|---|
| ***G01D 11/28*** | (2006.01) |
| ***G05G 1/10*** | (2006.01) |
| ***H01H 19/02*** | (2006.01) |
| *H01H 9/18* | (2006.01) |

(52) U.S. Cl.

CPC ............... *H01H 19/025* (2013.01); *G05G 1/10* (2013.01); *G05G 1/105* (2013.01); *H01H 9/182* (2013.01); *H01H 2219/0622* (2013.01)

USPC ................ 362/23.22; 362/23.07; 362/249.02; 362/602

(58) Field of Classification Search

USPC ......... 362/23.01, 23.07, 23.1, 23.22, 89, 227, 362/249.02, 602

See application file for complete search history.

(56) References Cited

U.S. PATENT DOCUMENTS

| | | | | |
|---|---|---|---|---|
| 7,878,669 | B2 * | 2/2011 | Jang et al. | 362/23 |
| 2009/0116239 | A1 | 5/2009 | Wu et al. | |
| 2010/0181175 | A1 | 7/2010 | Hamm | |

FOREIGN PATENT DOCUMENTS

| | | | |
|---|---|---|---|
| DE | 101 47 793 | | 2/2003 |
| DE | 10 2004 004 016 | A1 | 8/2005 |
| DE | 102 25 016 | | 12/2006 |
| DE | 10 2007 018 872 | | 10/2008 |
| EP | 1 898 184 | A2 | 3/2008 |

OTHER PUBLICATIONS

German Office Action dated Feb. 25, 2011 for DE 10 2010 31 405. 6-34.

European Patent Office search report dated Nov. 18, 2011 in EP 11 17 3122.

* cited by examiner

*Primary Examiner* — Meghan Dunwiddie

(74) *Attorney, Agent, or Firm* — Hope Baldauff, LLC

(57) ABSTRACT

A holding device for an operator control on a front cover of an electrical appliance is designed for attachment to the front cover and has a feedthrough for a rotating shaft of a rotary encoder of the operator control. The holding device is embodied in an annular fashion around the feedthrough and has a front cover attachment part as well as a lighting ring part which is fitted onto the front of the front cover attachment part. The lighting ring part essentially covers the front cover attachment part toward the front, wherein the two parts have a circular-ring-like intermediate space between them, in which intermediate space at least one component carrier, which has a plurality of LEDs on the side toward the front cover attachment part, is arranged.

27 Claims, 1 Drawing Sheet

HOLDING DEVICE FOR AN OPERATING DEVICE

RELATED APPLICATIONS

This application claims priority to German Patent 10 2010 031 405.6 filed on Jul. 15, 2010, the contents of which are incorporated by reference for all that it teaches.

FIELD OF APPLICATION

The present disclosure relates to a holding device for an operating device on a front cover of an electric appliance and to such a front cover.

BACKGROUND

It is known to design front covers of electrical appliances such as, for example, ovens or the like, in particular with at least one front cover opening such that a rotary encoder of an operating device can be attached behind the front cover. The rotating shaft of said rotary encoder projects through the front cover opening and a rotary knob is fitted thereon on the front side. In order to be able to illuminate this operating device or the rotary knob, for example to display information to an operator, it is possible according to EP 1 898 184 A2, to arrange LEDs on a printed circuit board of the rotary encoder. By means of lightguides, the light passes through a housing of the rotary encoder, a holding device and through the front cover to the rotary knob and to a ring surrounding the rotary knob.

SUMMARY

The invention is based on the object of providing a holding device as disclosed herein and to a front cover which is provided therewith, wherein problems associated with the holding device and front cover from the prior art can be avoided, and in particular to provide an advantageous possible way of illuminating an operating device of the holding device.

Advantageous and preferred embodiments of the invention are the subject matter of the further claims and are explained in more detail below. All the features which are specified for the securing device can, of course, also apply to the front cover with such a holding device. The wording of the claims is incorporated into the content of the description through express reference.

There is provision for the holding device to be designed to be attached to the front cover or to a front cover opening. The holding device has a feedthrough for a rotating shaft of a rotary encoder of the operating device. In the simplest case, this can be a central opening. Furthermore, the holding device is embodied in an annular fashion around the feedthrough or surrounds it and is therefore advantageously itself ring-like. Furthermore, the holding device has a front cover attachment part and a lighting ring part which is fitted onto the front of the front cover attachment part. The front cover attachment part projects into the front cover opening and projects over the latter, for example with a type of projecting collar, wherein the collar can rest on the front side of the front cover. Furthermore there is provision that the lighting ring part essentially covers the front cover attachment part toward the front by virtue of the fact that it is fitted thereon. The front cover attachment part and the lighting ring part have an intermediate space between them, which intermediate space is embodied in the manner of a circular ring and in which at least one component carrier is arranged. The component carrier has at least one LED, advantageously a plurality, to be precise at least on the side which points toward the front cover attachment part, that is to say points into the front cover opening away from the front side of the front cover. The front cover attachment part and the lighting ring part are advantageously plugged from the front onto the front cover or into the front cover opening, wherein the lighting ring part bears particularly advantageously against the front side of the front cover.

It is therefore possible that the LEDs do not have to be provided at a relatively large distance from the front cover or a lighting ring part but rather very close thereto. They can therefore be emitted into the lighting ring part or illuminate the latter without intermediate connection of further lightguides or the like. As a result, a higher luminosity and better light output is achieved.

In a further embodiment of the invention, the lighting ring part is designed to be at least partially translucent or light-guiding. In this context, the lighting ring part can be advantageously divided, in terms of its light-guiding properties, into various circular-ring-like circular ring sectors. This makes it possible to illuminate, for example, certain angular regions or the external region of the lighting ring part differently or with different colors if this is desired. The LEDs are advantageously arranged radially here within an outer edge of the lighting ring part which is to be mainly illuminated, and is consequently also translucent or light-guiding. In this way it can be emitted radially outward into corresponding regions.

In a further advantageous embodiment of the invention, the lighting ring part is arranged closed at the front cover attachment part and/or covers and terminates the latter toward the front, in particular also in a watertight fashion. For this purpose, it can, for example, be bonded on, or alternatively welded with ultrasonic sound. Furthermore, the front cover attachment part and/or lighting ring part can close off the front cover opening with respect to the front side of the front cover in a watertight fashion, with the result that fluid cannot penetrate through the front cover opening.

A plurality of LEDs are advantageously provided on the holding device, wherein for this purpose LED chambers between the lighting ring part and the front cover attachment part are provided in the intermediate space between the lighting ring part and front cover attachment part and are arranged distributed in the manner of a ring around the outer circumference of the lighting ring part. Typically, one or more LEDs can be arranged in these LED chambers. The LED chambers are advantageously separated or screened from one another, and therefore prevent transmission of light between them. It is possible to provide that a separate light duct or separate light-guiding means runs from each individual LED chamber to the lighting ring part or to the outer edge thereof. As a result, the previously mentioned illumination of the lighting ring part in certain areas is possible. At least 4 to 16 LEDs are advantageously provided in as many LED chambers.

The component carrier for the LEDs which is described above can run in a single plane. This is advantageously a perpendicular plane with respect to the longitudinal center axis of the feedthrough or perpendicular with respect to the rotating shaft, that is to say parallel to the front cover. Since the lighting ring part also essentially runs in this plane, the two can run in parallel and in particular close to one another, and can even possibly touch one another.

Although it is basically possible for the component carrier to be divided into a plurality of individual component carriers, which are then inserted between the front cover attachment part and the lighting ring part, a singular circular-ring-like component carrier is advantageously used, and this simplifies the manufacture, assembly and actuation.

A component carrier is advantageously generally equipped on one side, to be specific, as described above, only on the side toward the front cover opening, that is to say away from the rotary knob. This makes it possible to ensure that the LEDs which are arranged on the component carrier do not necessarily illuminate the lighting ring part directly in the direction of the rotary knob, where the lighting ring part runs, as a result of which more precise and desired emission of the light into the lighting ring part is possible. The component carrier therefore, as it were, screens the lighting ring part for the most part, with the result that light is advantageously input externally from the LEDs into the lighting ring part in a precisely determined way and is then distributed in said lighting ring part . It is also possible to provide further structural elements on the component carrier, for example electronic structural elements such as microcontrollers or the like. However, so that the component carrier remains as flat as possible, there should not be too many components and there should not be any large components. However, above all, electrical contacts are also provided here for actuating and supplying power to the LEDs.

Alternatively, it is possible for a component carrier to be embodied as a customary circuit board, such as an electrical circuit board. Alternatively, a component carrier can be made from plastic, or a plastic panel, possibly even made of film, onto which printed circuit boards for the LEDs and on electrical contacting means are applied. It can even be the inside of the lighting ring part. The LEDs are already advantageous as SMD-LEDs because of their size alone. They can advantageously be multicolored.

In a further embodiment of the invention, a position holding means or anti-rotation, means can be provided for the component carrier, specifically either on the lighting ring part and/or on the front cover attachment part. Such a holding means can be achieved by means of a recess with a corresponding projection. For this purpose, a hole can be provided, for example, on the component carrier, and a corresponding projection can be provided on the lighting ring part and/or front cover attachment part. Such an anti-rotation means can also be combined with an attachment, with the result that the component carrier is already attached in a captive fashion after it is fitted onto the lighting ring part or the front cover attachment part.

In a further embodiment of the invention there is provision that the feedthrough forms a type of tubular section which protrudes from the lighting ring part in a direction away from the front cover attachment part. The feedthrough can preferably be light-guiding or translucent. It is advantageously embodied in one piece with the lighting ring part, wherein, as described above, certain light-guiding regions, which are separated from one another, can also be provided here. This is easily possible using a multi-component plastic injection molding, during which nontranslucent regions are provided between light-guiding regions. The advantage of such a light-guiding feedthrough, which is therefore illuminated by one of the LEDs, is that the rotary knob is plugged thereon or covers the latter. It is therefore possible for light to be easily input from the feedthrough into the rotary knob or the front side thereof for the illumination thereof In a further embodiment of the invention, the lighting ring part can be embodied so as to be translucent or light-guiding from an outer edge as far as the tube-like projection or tubular projection on the feedthrough. As a result, the illumination at the lighting ring part or at its outer edge can therefore be achieved precisely as far as the feedthrough and therefore also at a rotary knob which is fitted on the front. No separate LEDs are then necessary for this, but no respectively separate lighting is then possible.

While, as has been described above, the LEDs are arranged on the side of the component carrier pointing into the front cover opening, their lighting direction runs radially outward and away from the component carrier and from the lighting ring part toward the front cover attachment part. There, the light can either be input into lightguides or into corresponding regions of the lighting ring part in order to illuminate the lighting ring part in the second case. In the first case, the LEDs are emitted into the outer region of the lighting ring part, which is particularly satisfactorily possible if the latter is bent at the outer edge toward the front cover, and therefore engages over the front cover attachment part in the outer region. The lighting ring part is then located radially outside the LEDs in a plane parallel to the front cover, with the result that, given such a lighting direction of the LEDs, their light is input directly into the lighting ring part. For this purpose, the lighting ring part can also have a lighting edge which runs obliquely with respect to the radial plane and which actually extends, as stated, as far as the front cover.

In a further embodiment of the invention, at least one contact duct can be provided in the front cover attachment part. Said contact duct can advantageously have a linear extent. It extends through from a side of the front cover attachment part pointing away from the lighting ring part as far as the component carrier or can end just before it. In the contact duct, it is possible for a means for forming electrical contact with the LEDs for their actuation or power supply to run as a breakthrough in the screening of the component carrier, which screening is otherwise provided through the front cover attachment part. Said contact-forming means can be, on the one hand, cables or other contact-forming means which are attached to the component carrier. A sprung contact device, in particular a metallic contact spring in the form of a helical spring, is advantageous. This contact spring is, on the one hand, pressed onto previously mentioned contact fields on the component carrier in order to form electrical contact therewith. By their other end, the contact springs are connected to a contact-forming means, for example to a circuit board or to a component carrier behind the front cover attachment part to which the rotary encoder is also attached. Actuation means for the LEDs or the lighting are then provided on this circuit board.

It is possible to provide that a contact spring is arranged in a captive fashion in the front cover attachment part. For this purpose, the diameter of the contact spring can be enlarged in certain areas compared to the diameter of the contact duct, or the contact duct can have a constriction compared to the diameter of the contact spring. A helical-spring-like contact spring in the front region is wound somewhat more thickly or with a larger diameter than in the rest of the profile, and therefore cannot drop downward and therefore cannot be lost during transportation and assembly.

In order to make an electrical contact-forming means, in particular an abovementioned contact spring, extend somewhat further than the front cover attachment part, that is to say as far as a component carrier described above or a circuit board, tube-like projections can be provided around the contact duct on the rear side of the front cover attachment part. Said projections form, as it were, a type of extension and can have a length of approximately the thickness of the front cover attachment part. As a result, a circuit board with which the contact springs make contact and which can have a rotary encoder, such as is known, for example, from the previously mentioned EP 1 898 184 A2, can be provided at a distance behind the front cover attachment part and behind the cover.

These and further features can be found not only in the claims but also in the description and the drawings, wherein the individual features can each be implemented independently or as a plurality thereof in the form of secondary combinations in an embodiment of the invention and in other fields, and can represent advantageous embodiments and embodiments which can be protected per se and for which protection is claimed here. The subdivision of the application into individual sections and secondary headings does not limit the general validity of the statements made under said sections and headings.

BRIEF DESCRIPTION OF THE DRAWINGS

An exemplary embodiment of the invention is illustrated schematically in the drawings and will be explained in more detail below. In the drawings.

DETAILED DESCRIPTION

Figure 1:
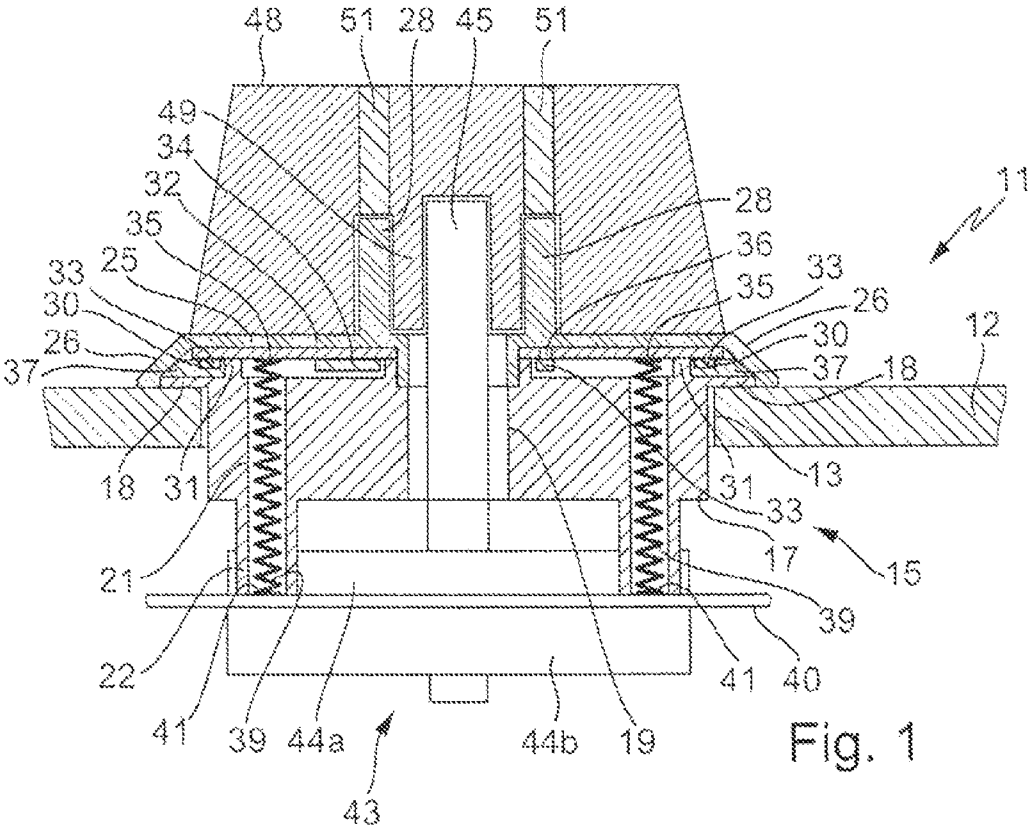
FIG. 1 shows a section through a front cover consistent with the invention with a holding device according to -the invention together with lighting.

FIG. 1 illustrates a front cover 11 according to the invention in section, wherein the front cover 11 has a front cover panel 12 with a front cover opening 13. This front cover 11 can be, for example, an oven front cover which is known per se or of another electrical appliance such as, for example, a hob, washing machine or a washer-dryer. It can also be in the form of a prefabricated unit which can be handled independently.

A holding device 15 according to the invention is inserted into the front cover 11. The holding device 15 has a rear front cover attachment part 17 with a circumferential collar 18 which bears on a front side, pointing upward in FIG. 1, of the front cover panel 12 and in the process engages over the front cover opening 13. The greater part of the front cover attachment part 17 projects into the front cover opening 13 or through it. In the center or centrally the front cover attachment part 17 has a feedthrough opening 19. The latter will be explained in more detail later. In the radially outer region of the front cover attachment part 17, contact ducts 21 are provided as continuous openings which are, as it were, extended to a rear side of the front cover attachment part 17 by means of contact duct projections 22. The number of these contact ducts 21 is dependent on the number of required electrical contacts. This will also be explained in more detail below.

A lighting ring part 25, which is also round but rather flat and relatively thin, is fitted from the front onto the front cover attachment part 17. The lighting ring part 25 has radially on the outside an oblique outer edge 26 which covers the outer region of the front cover attachment part 17 and also projects radially over it and likewise bears on the front side of the front cover panel 12. The lighting ring part 25 therefore covers the front panel attachment part 17 entirely. For the purpose of attachment, the lighting ring part 25 can be bonded onto the front cover attachment part 17.

In the central region, the lighting ring part 25 has an integrally embodied feedthrough projection 28. The latter forms, as it were in its interior, the continuation of the feedthrough opening 19 of the front cover attachment part. The lighting ring part 25 can be composed at least partially of light-guiding or transparent plastic. However, this will also be explained in more detail below.

An intermediate space, which has a circular ring shape around the feedthrough opening 19, is present between the front cover attachment part 17 and the lighting ring part 25 as a result of the distance of the two parts from one another. This intermediate space is relatively flat. It can have a single LED chamber 30 or advantageously a plurality of LED chambers 30, it can be divided into said LED chambers 30 or at least partially form the latter. In this context it is also apparent that a circumferential projection 31 is provided on the front cover attachment part 17, which projection 31 separates the intermediate space between the LED chambers 30 radially on the inside and the LED chambers 30 radially on the outside.

A circuit board 32, specifically essentially in the shape of a circular ring, is provided in the intermediate space between the front cover attachment part 17 and the lighting ring part 25. If a single circuit board 32 is provided, as illustrated here, it can form a closed circular ring, and under certain circumstances for reasons of assembly it can also form a cut-open circular ring, or a circular ring sector can be missing, for example in order to permit lateral fitting over the feedthrough opening 19. Alternatively, the circuit board 32 can be divided into multiple pieces.

A plurality of LEDs 33 are arranged on the circuit board 32 and connected electrically, specifically on the side pointing toward the front panel attachment part 17. The two outer LEDs 33 are arranged in LED chambers 30 lying on the outside, the chamber walls 37 of which are illustrated.

The latter serve to bound the LEDs 33 from one another and prevent transmission of light between said LEDs 33. Furthermore, they serve to increase the size of the area supporting the printed circuit board 32 or provide more stable support on the front side of the front panel 12. The LEDs 33 are embodied as laterally emitting LEDs and illuminate toward the side and radially outward into an oblique outer edge 26 of the lighting ring part 25.

Furthermore, a microcontroller 34, which can be used to actuate the LEDs 33, is also provided on the circuit board 32 in the left-hand region. Contact fields 35; which are located, above the contact ducts 21 and on which further details are given below, are provided.

Finally, a hole 36 is provided in the right-hand region of the circuit board 32. A further LED 33 is arranged under the hole 36, specifically with the lighting direction of said LED 33 pointing upward into the hole 36. This LED 33 is therefore arranged differently or embodied in a basically different way than the other LEDs 33 which are provided further outward and which are rather intended to emit radially outward. It is apparent that the feedthrough projection 28 is located above the hole 36 in the circuit board 32. It is therefore possible for this LED 33 to emit light under the hole 36 into the feedthrough projection 28 and illuminate the latter. Further details are given below.

Elongate metallic contact springs 39 in the form of helical springs are inserted into the contact ducts 21. With their upper region, said contact springs 39 bear on the contact fields 35, described above, on the circuit board 32. With their lower end, they bear on a printed circuit board 40 or on contact-forming means 41 in the form of fields with printed circuit boards. It is therefore possible for the formation of electrical contacts with the circuit board 32 or with the LED 33 and the microcontroller 34 to take place via corresponding connections on the printed circuit board 40. For this purpose, a corresponding number of contact springs 39 can be provided, that is to say even more than the two contact springs illustrated here, for example three. The contact springs 39 have, in their upper region, a discernable thickening of the diameter, and they therefore cannot fall downward in the contact duct 21. They are therefore secured in a captive fashion. They can also be made to extend as a single wire in a straight shape in the lower region toward the printed circuit board 40 in order to form contact therewith, and therefore do not need to be wound in the manner of a helical spring here.

The printed circuit board 40 has the rotary encoder 43 with a housing part 44*a* above the printed circuit board 40 and a housing part 44*b* below it. This rotary encoder 43 is advantageously connected to the front panel attachment part 17, for example to the contact duct projections 22 thereof. The latter can extend, as illustrated, into the upper housing part 44*a* or only as far as said upper housing part 44*a*. A rotating shaft 45 of the rotary encoder 43 runs through the feedthrough opening 19 and the feedthrough projection 28 and therefore projects far over the front cover panel 12. Such a rotary encoder 43 is known from EP 1 898 184 A2 previously mentioned, and its contents are incorporated by reference into the present description.

A rotary knob 48 is fitted onto the rotating shaft 45, specifically both securely and captively. The rotary knob 48 has for this purpose a rotating shaft receptacle 49 which extends as a protruding section into the feedthrough projection 28 so as to be seated securely on the rotating shaft 45. Furthermore, a rotary bearing can be provided on the feedthrough projection 28 through this rotating shaft receptacle 49 and the outer region of the rotary knob 48, with the result that tilting forces or forces perpendicular with respect to the longitudinal direction of the rotating shaft 45 can be taken up thereby and do not damage the rotating shaft 45 or the rotary encoder 43 itself. In this context the rotary knob 48 extends virtually as far as the lighting ring part 25.

Figure 2:
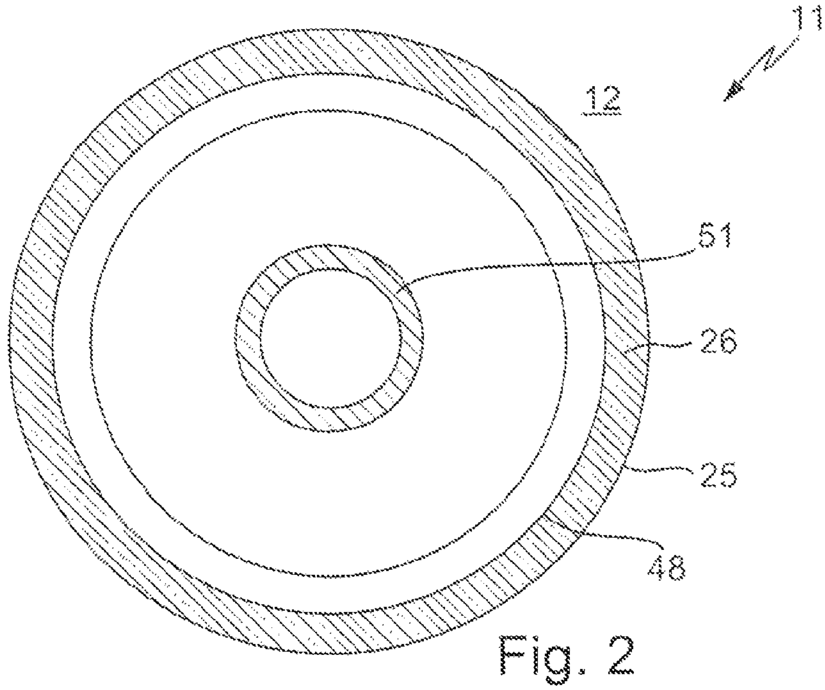
FIG. 2 shows a plan view of the arrangement from FIG. 1.

It is also apparent how a lightguide ring 51 is provided in the rotary knob 48, specifically precisely as a continuation of the feedthrough projection 28. Even if the rest of the rotary knob 48 is manufactured from a nontranslucent material, this lightguide ring 51, which has been injection-molded into the rotary knob 48 with correspondingly light-guiding plastic using, for example, a multi-component injection-molding method, can also be illuminated. It is in fact readily apparent that light from the feedthrough projection 28 can, as described above, be input directly into the lightguide ring 51 and then be emitted forward from it. This is also readily apparent in the plan view according to FIG. 2, with the lightguide ring 51 in the central region of the rotary knob 48. Likewise, FIG. 2 shows the lighting ring part 25 and the oblique outer edge 26 which is designed to extend around in an annular shape. Lighting can be provided here by means of the external LEDs 33 according to FIG. 1, as illustrated in various regions.

An anti-rotation means can also be provided, for example, in conjunction with the hole 36 in the circuit board 32, by means of a corresponding light-guiding projection on the underside of the lighting ring part 25 as an extension of the feedthrough projections 28 at this point. Alternatively, the hole can be nonround, for example quadrilateral, in the center of the circuit board 32, and can fit through the lighting ring part 25 in order to form a corresponding embodiment of the feedthrough of the rotating shaft 45. It is also illustrated that, for an anti-rotation means on the left-hand inner region the circuit board 32 is made to extend as far as the lightguide ring part 25, but not on the right-hand inner region. The anti-rotation means is produced as a result of this nonround shape.

A rotary encoder 43 can advantageously be what is referred to as a code switch such as it is known, for example, from U.S. Pat. No. 7,492,244, and it no longer has its own lighting here but then only makes available the power supply for the LEDs 33 as lighting on its printed circuit board 40. However, the switching on and off, flashing and thresholds continue to be controlled by the code switch. It is possible to provide LEDs 33 for illuminating the outer ring on the oblique outer edge 26 and/or for the lightguide ring 51.

In a further general embodiment there is provision that the LEDs 33 are not actuated by electronics of the rotary encoder 43 or of the code switch but rather by means of the device's own microcontroller 34 on the circuit board 32. This microcontroller 34 communicates with the electronics of the rotary encoder 43 and receives therefrom corresponding information, in particular about rotary angles or operating states. The microcontroller 34 actually converts said information into various lighting states of the LEDs 33, each individual one of which can be actuated individually. As a result, for example running lights and color changes are possible. The circuit board 32 of the lighting system receives, as it were, from the code switch printed circuit board 40 the data such as the rotary angle or operating states in a serial digital form as well as the electrical energy, and otherwise it operates with the microcontroller 34, as it were, autonomously in terms of control technology. In order to transmit the data with a bus connection, a further contact spring is necessary as a third contact spring.

It is generally also possible to use the serial bus for the communication-with the microcontroller 34, which serial bus is also connected to the rotary encoder. Via said serial bus, the rotary encoder transmits corresponding commands to function units of the abovementioned electric appliance, for example a heating device, or some other control device of the electric appliance.

Alternatively, the data can be transmitted optically. For this purpose, a light transmitter is generally provided on the actuation means, advantageously on the printed circuit board 40. A corresponding light receiver with a light-guiding duct through the front cover attachment part 17 is arranged on the circuit board 32 as an optical transmission link. The optical method is appropriate since, given a corresponding configuration, the transmission link is virtually immune from interference by extraneous light and the expenditure is low.

Just a single LED as a light transmitter is then necessary on the code switch printed circuit board 40, and a corresponding phototransistor as a light receiver is necessary on the circuit board 32. The code switch transmits its angular position and the lighting mode such as off, on, flashing, thresholds etc. No specific software is therefore necessary for the respective application. The microcontroller 34 of the lighting system calculates, on the basis of the received angular position, which or how many LEDs 33 it has to switch on depending on the desired lighting mode.

If multicolored LEDs 33 are used, the possibility, is obtained of displaying a colored dot on the illuminated or unilluminated circular path along the outer edge, 26 in accordance with the angular position of the rotary knob, for example instead of currently customary display points on the rotary knob. However, the angular, position can also be indicated by the change of color. For example the LEDs of power setting 0 to 4 light up in red and those from 5 to 9 light up in white.

Such an indication of the power setting, for example corresponding to the rotary position of the rotary knob 48 can also be generated by a type of annular bar graph, that is to say a strip of illuminated LEDs 33, on the lighting ring part 25 or outer edge 26. If the full circle being illuminated is considered to represent full power in a power display, at half power a half circular section with a somewhat stronger luminosity or more conspicuous color can be illuminated, advantageously starting from a visible point in the clockwise direction, The other half of the circular section lights up to a lesser degree or with a less conspicuous color and closes the gap from the first circular section. This is illustrated by the different thicknesses of hatching at the outer edge 26 in FIG. 2. This relationship is shifted in the case of a higher power in such a way that the more conspicuous first circular section becomes longer and the other shorter. In the case of a lower power, it becomes shorter and the other longer. The different hatching on the lightguide ring is intended to illustrate its illumination. Here, it is only divided into two sections, but there can likewise be as many as there are LEDs 33 or LED chambers 30, and they can then light up with different divisions and colors.

In a control device, for example of the electrical appliance or in the rotary encoder 43, different operating states or operating information as well as also false information can be displayed with different lighting modes. This is possible by means of different types of flashing or brightness and duration or frequency and, above all, through flashing or lighting up with differently arranged sectors as well as different numbers of sectors. In the case of complicated fault messages, complex flashing patterns and lighting patterns can be generated, and said flashing patterns or lighting patterns are then noted individually in a manual. However, it is also advantageously possible to display input requests or else input confirmations to an operator.

The invention claimed is:

1. A holding device for an operating device on a front cover of an electric appliance, the holding device comprising:

- a front cover attachment part; and
- a lighting ring part configured to be fitted onto the front of the front cover attachment part,
- wherein the holding device is designed for attachment to the front cover,
- wherein the holding device has a feedthrough for a rotating shaft of a rotary encoder of the operating device,
- wherein the holding device is embodied in an annular fashion around the feedthrough,
- wherein the lighting ring part essentially covers the front cover attachment part toward the front,
- wherein the front cover attachment part and the lighting ring part have a circular-ring-like intermediate space between them, in which intermediate space comprising at least one component carrier is arranged, and
- wherein the at least one component carrier has at least one LED on a side toward the front cover attachment part; and
- wherein an anti-rotation means is provided for the component carrier on the lighting ring part or on the front cover attachment part.

2. The holding device as claimed in claim 1, wherein the lighting ring part is at least partially translucent or light-guiding.

3. The holding device as claimed in claim 2, wherein the lighting ring part is arranged in closed form at the front cover attachment part or covers the front cover attachment part toward the front.

4. The holding device as claimed in claim 1, wherein the lighting ring part is bonded onto the front cover attachment part.

5. The holding device as claimed in claim 1, wherein a plurality of LEDs are arranged in LED chambers between the lighting ring part and the front cover attachment part, wherein the individual LED chambers are separated from one another.

6. The holding device as claimed in claim 1, wherein the at least one component carrier runs in a single plane perpendicularly with respect to a longitudinal center axis of the feedthrough.

7. The holding device as claimed in claim 1, wherein the component carrier is circular ring-link and further wherein only one component carrier is provided on one side only.

8. The holding device as claimed in claim 1, wherein the feedthrough comprises a tubular section protruding from the lighting ring part in a direction away from the front cover attachment part.

9. The holding device as claimed in claim 8, wherein the lighting ring part is translucent or light-guiding in radially running regions that are separated from one another in a nontranslucent fashion, from an outer edge of the lighting ring part as far as the tubular section on the feedthrough.

10. The holding device as claimed in claim 1, wherein a lighting direction of the at least one LED is radially outward or away from the component carrier and from the lighting ring part toward the front cover attachment part.

11. The holding device as claimed in claim 1, wherein the lighting ring part extends radially to outside of the at least one LED with a lighting edge running obliquely with respect to a radial plane of the lighting ring part.

12. The holding device as claimed in claim 1, wherein at least one contact duct is provided in the front cover attachment part, said contact duct extending through from a side of the front cover attachment part pointing away from the lighting ring part as far as the component carrier and configured to accommodate an electrically conductive spring contact device for the purpose of bringing about electrical contact between the component carrier and an actuation device arranged behind the front cover attachment part.

13. The holding device as claimed in claim 12, wherein the contact spring is arranged in a secure fashion in the front cover attachment part whereby a certain portion of a diameter of the contact spring is larger than a diameter of a certain portion of the contact duct.

14. The holding device as claimed in claim 12, wherein tube-like projections are provided on a rear side of the front cover attachment part in order to extend the contact duct for the electrically conductive spring contact device.

15. The holding device as claimed in claim 2, wherein the lighting ring part is at least partially translucent or light-guiding in various circular ring sectors that are divided up in the manner of circular rings.

16. The holding device as claimed in claim 5 wherein said individual LED chambers form separate light ducts or light-guiding means from the at least one LED to the lighting ring part, wherein the light ducts or the light guiding means are distributed in the manner of a ring around the out circumference of the lighting ring part.

17. The holding device as claimed in claim 1, wherein the anti-rotation means is a non-round or polygonal opening on the component carrier having a correspondingly formed projection on the lighting ring part or said front cover attachment part that engages in the opening.

18. The holding device as claimed in claim 8, wherein the feedthrough is light-guiding or translucent.

19. The holding device as claimed in claim 18, wherein the feedthrough is embodied in one piece with the lighting ring part.

20. The holding device as claimed in claim 10, comprising a plurality of LEDs wherein the LEDS are laterally emitting LEDS.

21. The holding device as claimed in claim 12, wherein the actuation device is a rotary encoder.

22. The holding device as claimed in claim 12, further comprising two said contact springs for said microcontroller transmitting data.

23. A system comprising:

a front cover for an electrical appliance;

a holding device comprising a lighting ring part configured to be fitted onto the front of the front cover attachment part, wherein the holding device is designed for attachment to the front cover, wherein the holding device has a feedthrough for a rotating shaft of a rotary encoder of the operating device, wherein the holding device is embodied in an annular fashion around the feedthrough, wherein the lighting ring part essentially covers the front cover attachment part toward the front, wherein the front cover attachment part and the lighting ring part have a circular-ring-like intermediate space between them, in which intermediate space comprising at least one component carrier is arranged, wherein the at least one component carrier has at least one LED on a side toward the front cover attachment part, and wherein the holding device is attached to the front cover; and a rotary encoder, wherein the rotary encoder is attached to the holding device behind the front cover, the rotary encoder comprising a rotatable shaft extending through a passage and on which a rotary knob is fitted in front of the front cover.

24. A holding device for an operating device on a front cover of an electric appliance, the holding device comprising:

a front cover attachment part; and a lighting ring part configured to be fitted onto the front of the front cover attachment part, wherein the holding device is designed for attachment to the front cover, wherein the holding device has a feedthrough for a rotating shaft of a rotary encoder of the operating device, wherein the holding device is embodied in an annular fashion around the feedthrough, wherein the lighting ring part essentially covers the front cover attachment part toward the front, wherein the front cover attachment part and the lighting ring part have a circular-ring-like intermediate space between them, in which intermediate space comprising at least one component carrier is arranged, and wherein the at least one component carrier has at least one LED on a side toward the front cover attachment part; and a microcontroller, wherein the microcontroller is arranged on the component carrier for actuating the at least one LED, and wherein the microcontroller has a means of transmitting data to the actuation device.

25. The holding device as claimed in claim 24, wherein a light transmitter is provided on the actuation device for optically transmitting data, and wherein a light receiver is connected to the microcontroller and is provided on the component carrier.

26. The holding device as claimed in claim 24, wherein a serial bus is provided on the component carrier for transmitting data to the microcontroller, said serial bus being also provided for the rotary encoder or for the actuation thereof.

27. The holding device as claimed in claim 24, wherein the microcontroller is configured so as to actuate the at least one LED in multiple colors.

* * * * *